UNITED STATES PATENT OFFICE.

FRANK A. FAHRENWALD, OF CLEVELAND, OHIO, DEDICATED, BY MESNE ASSIGNMENTS, TO THE GOVERNMENT OF THE UNITED STATES OF AMERICA AND TO THE PEOPLE OF THE UNITED STATES OF AMERICA.

PROCESS OF COATING OR JOINING ARTICLES OF TUNGSTEN OR MOLYBDENUM.

1,263,656.

Specification of Letters Patent.   Patented Apr. 23, 1918.

No Drawing.   Application filed May 31, 1916.   Serial No. 100,998.

(DEDICATED TO THE PUBLIC.)

*To all whom it may concern:*

Be it known that I, FRANK A. FAHRENWALD, a citizen of the United States, residing at Cleveland, in the county of Cuyahoga and State of Ohio, have invented a certain new and useful Improvement in Processes of Coating or Joining Articles of Tungsten or Molybdenum, of which the following is a full, clear, and exact description.

This application is made under the act of March 3, 1883, chapter 143 (22 Stat. 625) and the invention herein described and claimed may be used by the Government of the United States, or any of its officers or employees in the prosecution of work for the Government or by any person in the United States without the payment of any royalty thereon. The invention relates to a composition of matter for use in coating or soldering metals, or coating metals for soldering purposes. The invention is particularly designed for the purpose of soldering tungsten, molybdenum, or their alloys, and other metals of like nature; although it is not restricted to use upon such metals only, or to soldering purposes only, but may be employed with other metals, or for coating purposes merely, or for any other purpose for which it may be useful. However, in the following description I shall confine myself more especially to the particular functions above mentioned, but with the proviso that this is only one of many uses and the described metals are only a few of the many substances to which my invention is applicable.

On account of the ease of oxidation of tungsten, molybdenum, and the like metals at high temperatures (say above 600° C.) and because of their small affinity at ordinary working temperatures for metals or alloys to which it is desired to unite them, the soldering or brazing of metallic masses of this type is impossible or very difficult by the usual means and methods. However tungsten and molybdenum, or their high percentage alloys, possess special properties which render them very valuable for purposes in which their high melting point, superior hardness, elasticity, rigidity, chemical resistivity, and high annealing temperature are desirable. For example in dental work the securing of a crown in place frequently necessitates the use of a post for its support, which post is anchored in the root of the tooth. This post must be of some metal which shall not react with any substance with which it comes in contact, it must be strong and stiff, it must be substantially permanent, and it should be of very small size in order to avoid the necessity for removing too much tooth structure, thereby destroying the foundation. Tungsten, molybdenum, and their high percentage alloys fulfil all these requirements excepting that the difficulty of soldering or otherwise affixing the completed crown thereto has greatly impeded their use. In addition there are a great many occasions where metals of this nature are useful in chemical, physical and other scientific apparatus, and in practical arts.

I have discovered that the soldering of these metals can be very conveniently effected by the employment of a proper flux, the nature of said flux depending upon the nature and composition of the original metal, and of the applied metal, and of the use to which the whole is to be put. Such a flux must possess a fusing point below that of the soldering material and should not be completely volatilized at the working temperature. It should readily dissolve the metallic oxid coating, present or formed in heating, and should be of such material as to prevent further oxidation during the soldering operation. It should produce a clean metallic surface with which the added alloy or metal will readily unite. Also it must be of such a nature as not to react injuriously upon the original metal as by crystallizing or dissolving it and must be applicable under such temperatures and within such a length of time as will not injure that metal.

In developing the material for this purpose, I have found that the oxygen salts of the alkali metals form the best flux for dissolving the oxid from the surface of the metal. There are a number of these salts that can be used, and any may be chosen which will form an alkali tungstate or molybdate by uniting with the oxid of these metals. I have found that sodium carbonate or better still a mixture of the same with fused borax serves very satisfactorily for this purpose, though many alkali salts will serve.

This cleansing flux alone, however, is hardly sufficient, since even with its use it is very difficult to cause any of the precious metals, as gold, silver, palladium, platinum, or their alloys to unite with molybdenum or tungsten metals or their alloys under ordinary conditions of manipulation. It can sometimes be done, but the operation is uncertain and the security of contact imperfect. To overcome this difficulty I add to this flux a salt of a precious metal, for example, chlorid of silver, gold, palladium, or platinum, or a mixture of any of these in any proportion. The finely divided metals themselves may be intimately mixed with the flux and give practically as good results, although I prefer to employ one of their salts from the fact that segregation before application is less to be feared than in the case of the metal itself. For operative purposes, however, it is necessary only that some such finely divided metal or metal salt (either in the combined or uncombined form) be added as will appear in the fused metallic condition after the flux is applied and melted.

The use and action of this flux combination is then essentially as follows: The tungsten or molybdenum metals or alloys are heated and dipped into or drenched with the powdered flux causing a small amount to adhere to the hot surface. Heat in stronger degree is then applied from a blast lamp or blow pipe or other suitable means. As the temperature is raised, the alkali salt melts, reacts with the surface oxid, thoroughly cleaning the metal, upon which is simultaneously deposited the metallic content of the flux, which has also become molten. The surface thus receives a cleansing and protective treatment practically simultaneously, and may then be soldered or brazed by adding ordinary gold or precious metal solders in the usual manner. It is best to complete the operation by adding the required amount of solder and melting down with the flux. The temperature should be maintained below about 1400° C. and even this temperature maintained for not more than about 30 seconds in the case of ductile tungsten or molybdenum, since a higher temperature or a longer time tends to weaken the metal. Of course lower temperatures can safely be maintained for a longer time but the time factor is best kept as low as convenient.

With this flux I have found it comparatively simple to unite structural units of tungsten or molybdenum wires or sheets, and to recoat bare places of precious-metal-coated tungsten or molybdenum. This flux may also be used with or without the addition of more precious metal, to coat surfaces of refractory and oxidizable metals or alloys.

The particular metal, or metals, incorporated with the flux can be chosen to meet desired conditions, or to duplicate the solder to be used or precious metals to be united. If it is desired to unite tungsten to gold, or if the gold coated tungsten is used, the flux may contain only gold, so that the gold color may be maintained. If a platinum color is desired, palladium or platinum may be added, which also gives a stronger bond and a joint of higher melting point. In this manner pure platinum may be used in extreme cases, although its use requires very delicate manipulation since with temperatures much above 1400° C. there is danger of crystallization or annealing. Silver alone may be employed but adheres rather weakly and appears for some unknown reason to accelerate crystallization, wherefore its use alone is not recommended. Palladium alone adheres very strongly and even alloys slightly, but also, when used alone, appears to accelerate crystallization though when used in company with a preponderance of gold this deteriorating effect is not observable. Gold alone has comparatively little affinity for tungsten or molybdenum and the line of contact is rather clearly defined, though it adheres reasonably well for all practical purposes and forms a most beautiful coating without any injury to the metal beneath. Its adhesion is improved by the addition of five to ten per cent. of palladium, and without inimical effect so far as observed, and this I consider the most perfect coating. Metals of the platinum group, or other refractory precious metals, such as iridium for example, have a marked dissolving effect, so that if a true alloyed bond is desired one or more of these metals should be present. Other metals, as copper, may be used in this flux if precautions are observed, which use is sometimes desirable in case a gold-copper or silver-copper alloy is to be attached.

The metallic contact of the flux may vary within very wide limits; I have obtained perfect (but very thin) protective coatings with as low as two per cent. of precious metal in the flux, although I prefer to employ a larger proportion. With this flux as a soldering or brazing medium, it is possible to fasten electrical contact joints, to solder and build up apparatus and appliances of various forms, to make electrical connection, and in fact to perform any operation of joining where it is desired to solder or braze tungsten or molybdenum metals or their alloys; in addition to the dental uses above suggested. In the use of this flux the temperatures employed are not sufficiently high to anneal or recrystallize these metals, so that their elasticity, ductility, tensile strength and rigidity are not impaired.

In the claims hereto annexed the words "alkali salt" are intended to embrace either a simple or a compound salt or a mixture of salts of several alkalis, and the same may be either oxygen containing or oxygen free or a mixture of the same except where specifically recited. Also by the words "precious metal containing" or "precious metal in finely divided form" I mean to embrace either the metal occurring in the metallic condition or in the combined condition as in a precious metal salt.

Having thus described my invention, what I claim is:—

1. The process of coating tungsten or molybdenum or alloys of the same which contains the step of heating the same in contact with a dry flux consisting largely of an alkali salt having a finely divided precious metal intimately mixed therewith.

2. The process of treating tungsten or molybdenum or their alloys which consists in covering the same with a flux containing an alkali salt and a precious metal, and afterward heating the same to a temperature at least as high as the melting point of the said precious metal.

3. The process of soldering tungsten or molybdenum or their alloys which consists in first covering the articles with a flux containing a precious metal mixed with an alkali salt, next heating the articles to a temperature at least as high as the melting point of the said precious metal, and third adding a soldering metal or alloy of a nature which will alloy with said precious metal.

In testimony whereof, I hereunto affix my signature.

FRANK A. FAHRENWALD.